(12) United States Patent
Shalon

(10) Patent No.: US 10,025,113 B2
(45) Date of Patent: *Jul. 17, 2018

(54) FOLDABLE EYEGLASSES AND CASE

(71) Applicant: THINOPTICS, INC., Palo Alto, CA (US)

(72) Inventor: Tadmor Shalon, Palo Alto, CA (US)

(73) Assignee: THINOPTICS, INC., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/639,244

(22) Filed: Jun. 30, 2017

(65) Prior Publication Data

US 2017/0299885 A1    Oct. 19, 2017

Related U.S. Application Data

(63) Continuation of application No. 14/843,619, filed on Sep. 2, 2015, now Pat. No. 9,726,902, which is a (Continued)

(51) Int. Cl.
*G02C 5/06* (2006.01)
*G02C 5/08* (2006.01)
(Continued)

(52) U.S. Cl.
CPC ............... *G02C 5/08* (2013.01); *A45C 11/00* (2013.01); *A45C 11/04* (2013.01); *G02C 5/06* (2013.01);
(Continued)

(58) Field of Classification Search
CPC ... G02C 1/00; G02C 1/02; G02C 1/04; G02C 1/06; G02C 3/00; G02C 3/003;
(Continued)

(56) References Cited

U.S. PATENT DOCUMENTS 261,799 A    7/1882  Woodward
272,450 A *  2/1883  Manning ............... A45C 11/04
                                                206/5

(Continued)

FOREIGN PATENT DOCUMENTS

DE          4407313 A1     9/1995
EP          2016457 B1     6/2011
WO     WO2010/086650 A1    8/2010

OTHER PUBLICATIONS

Pince-Nez; www.en.wikipedia.org/wiki/Pince-nez; pp. 1-4; printed Sep. 20, 2013.

(Continued)

*Primary Examiner* — Thomas K Pham
*Assistant Examiner* — Ibrahima Diedhiou
(74) *Attorney, Agent, or Firm* — Shay Glenn LLP

(57) ABSTRACT

An eyewear system including eyeglasses and a case, the eyeglasses having a first lens, a second lens, and a bendable bridge disposed between the first lens and second lens, the bendable bridge having a spring providing a spring force when the bridge is bent from a rest position, the eyeglasses being adapted to move from a wearable configuration in which the first and second lens do not overlap to a stored configuration in which the first and second lenses at least partially overlap, the bendable bridge being bent from its rest position in the stored configuration, the case having an opening through which the eyeglasses pass during insertion and guides sized and configured with respect to the eyeglasses to engage and fold the eyeglasses against spring force of the bridge to the stored configuration during insertion of the eyeglasses through the opening and into the case.

15 Claims, 15 Drawing Sheets

Related U.S. Application Data continuation-in-part of application No. 14/659,153, filed on Mar. 16, 2015, now Pat. No. 9,158,125, which is a continuation of application No. 14/284,879, filed on May 22, 2014, now Pat. No. 9,081,209, which is a continuation-in-part of application No. 13/899,606, which is a continuation of application No. PCT/IB2011/055208, filed on Nov. 21, 2011, now Pat. No. 9,069,189.

(60) Provisional application No. 61/344,930, filed on Nov. 22, 2010, provisional application No. 61/826,127, filed on May 22, 2013, provisional application No. 62/170,543, filed on Jun. 3, 2015.

(51) Int. Cl.
*A45C 11/00* (2006.01)
*A45C 11/04* (2006.01)
*G02C 5/12* (2006.01)

(52) U.S. Cl.
CPC .............. *G02C 5/122* (2013.01); *G02C 5/128* (2013.01); *A45C 2011/002* (2013.01)

(58) Field of Classification Search
CPC . G02C 5/008; G02C 5/00; G02C 5/02; G02C 5/04; G02C 5/06; G02C 5/08; G02C 5/12; G02C 5/122; G02C 5/124; G02C 5/126; G02C 5/128; G02C 5/2263; G02C 6/3859; G02C 2027/0178; A45C 11/00; A45C 11/04; A45C 11/06; A45C 11/182; A45C 15/00; A45C 2011/002; A45F 2200/0541; B29D 12/02
USPC ........ 351/41, 63, 64, 65, 68, 69, 70, 71, 72, 351/76, 78, 79, 80, 81, 124, 126, 128, 351/132, 136, 137, 138; D3/201, 207, D3/212, 226, 247, 249, 263, 265, 266, D3/303; D11/200; D16/300, 303, 330, D16/322, 332, 339; 206/5, 216
See application file for complete search history.

(56) References Cited

U.S. PATENT DOCUMENTS

| | | |
|---|---|---|
| 353,203 A | 11/1886 | Chase |
| 380,491 A | 4/1888 | Kahn |
| 470,029 A | 3/1892 | Wood |
| 529,988 A | 11/1894 | Wood |
| 585,619 A | 6/1897 | Cottet, Jr. |
| 677,996 A | 7/1901 | Kleinert |
| 1,017,579 A | 2/1912 | Nicol |
| 1,919,938 A | 7/1933 | Fielding |
| 1,931,634 A | 10/1933 | Tanasso et al. |
| 2,004,445 A | 6/1935 | Meyer |
| 2,023,469 A | 12/1935 | Grier |
| 2,036,591 A | 4/1936 | Marciano |
| 2,047,646 A | 7/1936 | Nerney |
| 2,061,411 A | 11/1936 | Tanasso et al. |
| 2,234,729 A | 3/1941 | Montalvo-Guenard |
| 2,478,921 A | 8/1949 | Hansen |
| 3,085,584 A | 4/1963 | Hollinger |
| D209,016 S | 10/1967 | Weissman |
| 3,395,964 A | 8/1968 | Nieder |
| D220,597 S | 4/1971 | Dawson et al. |
| D247,111 S | 1/1978 | Olivan |
| 4,600,279 A | 7/1986 | Tabacchi |
| D289,122 S | 4/1987 | Meyer et al. |
| 4,772,112 A | 9/1988 | Zider et al. |
| 4,840,476 A | 6/1989 | Rooney |
| D305,478 S | 1/1990 | Lahm et al. |
| 4,896,955 A | 1/1990 | Zider et al. |
| 4,924,245 A | 5/1990 | Dianitsch |
| 5,015,087 A | 5/1991 | Baratelli |
| D318,949 S | 8/1991 | Mawhinney et al. |
| D322,262 S | 12/1991 | Manus |
| D330,456 S | 10/1992 | Lehman |
| D343,402 S | 1/1994 | Scoppettone |
| 5,369,451 A | 11/1994 | Tamagawa |
| 5,431,506 A | 7/1995 | Masunaga |
| D363,603 S | 10/1995 | Leveen et al. |
| D371,679 S | 7/1996 | Nejman |
| D379,558 S | 6/1997 | Mischenko et al. |
| 5,646,707 A | 7/1997 | Arnette |
| 5,748,280 A | 5/1998 | Herman |
| D407,591 S | 4/1999 | Bolognia et al. |
| D418,857 S | 1/2000 | Paulsen et al. |
| 6,017,119 A | 1/2000 | Huang |
| D421,526 S | 3/2000 | Isaacson |
| 6,077,368 A | 6/2000 | Nakamura et al. |
| D428,253 S | 7/2000 | Huang |
| D435,340 S | 12/2000 | Kojoori |
| 6,158,860 A | 12/2000 | Huang |
| D436,613 S | 1/2001 | Chao |
| D438,904 S | 3/2001 | Reynolds |
| 6,264,326 B1 | 7/2001 | Hyoi |
| D446,237 S | 8/2001 | Koevari |
| D451,119 S | 11/2001 | Koevari |
| 6,371,614 B1 | 4/2002 | Herman |
| 6,773,106 B2 | 8/2004 | Herman |
| 6,814,226 B2 | 11/2004 | Chao |
| D503,087 S | 3/2005 | Dzwill et al. |
| D507,871 S | 8/2005 | DiMarchi et al. |
| D515,805 S | 2/2006 | Jones |
| D518,636 S | 4/2006 | Sievers |
| D527,891 S | 9/2006 | Hoeksema |
| 7,117,990 B2 | 10/2006 | Sharif |
| D555,900 S | 11/2007 | Pippin |
| 7,452,070 B2 | 11/2008 | Oskarsson |
| D585,471 S | 1/2009 | Thompson |
| 7,484,843 B1 | 2/2009 | Lin |
| 7,748,843 B2 | 7/2010 | Stewart |
| D631,246 S | 1/2011 | Boettner |
| D651,799 S | 1/2012 | Dial |
| D653,656 S | 2/2012 | Charnas et al. |
| D669,082 S | 10/2012 | Sato |
| D684,367 S | 6/2013 | Phillips et al. |
| D687,376 S | 8/2013 | Farris-Gilbert et al. |
| D692,236 S | 10/2013 | Ashkenazy |
| D703,198 S | 4/2014 | Simmer |
| D703,722 S | 4/2014 | Kim et al. |
| D713,145 S | 9/2014 | Fathollahi |
| D714,058 S | 9/2014 | Owen |
| D714,550 S | 10/2014 | Yoo |
| D715,052 S | 10/2014 | Fair |
| D716,045 S | 10/2014 | Requa |
| D716,049 S | 10/2014 | Fair |
| D719,950 S | 12/2014 | Smith et al. |
| D721,493 S | 1/2015 | Godshaw et al. |
| D724,833 S | 3/2015 | Schneider et al. |
| D724,834 S | 3/2015 | Schneider et al. |
| D726,246 S | 4/2015 | Shalon |
| D726,413 S | 4/2015 | Shalon |
| 9,069,189 B2 | 6/2015 | Shaion |
| 9,081,209 B2 | 7/2015 | Shaion |
| 9,158,125 B2 | 10/2015 | Shaion |
| D765,975 S | 9/2016 | Hoofnagle et al. |
| 9,696,756 B1 | 7/2017 | Olsson et al. |
| 9,726,902 B2 | 8/2017 | Shalon |
| 2001/0028431 A1 | 10/2001 | Rossin |
| 2001/0055093 A1 | 12/2001 | Saitoh et al. |
| 2003/0025871 A1 | 2/2003 | Masunaga |
| 2004/0256249 A1* | 12/2004 | Sarif .................... A45C 11/04 206/5 |
| 2009/0051868 A1 | 2/2009 | Kwan |
| 2009/0310080 A1 | 12/2009 | Dellapina |
| 2012/0140163 A1 | 6/2012 | Hogan |
| 2012/0218506 A1 | 8/2012 | Perez |

(56) References Cited

U.S. PATENT DOCUMENTS

2014/0317886 A1* 10/2014 Shwartz .................. A45F 5/00
                                                                             24/3.3
2014/0360898 A1    12/2014  Kantor et al.

OTHER PUBLICATIONS

Shalon; Design U.S. Appl. 29/567,667 entitled "Eyeglasses case," filed Jun. 10, 2016.

* cited by examiner

FOLDABLE EYEGLASSES AND CASE

CROSS REFERENCE TO RELATED APPLICATIONS

This application is a continuation of U.S. application Ser. No. 14/843,619, filed Sep. 2, 2015, now U.S. Pat. No. 9,726,902; which is a continuation-in-part of U.S. application Ser. No. 14/659,153, filed Mar. 16, 2015, now U.S. Pat. No. 9,158,125; which is a continuation of U.S. application Ser. No. 14/284,879, filed May 22, 2014, now U.S. Pat. No. 9,081,209; which is a continuation-in-part of U.S. application Ser. No. 13/899,606, filed May 22, 2013, now U.S. Pat. No. 9,069,189; which is a continuation of PCT/IB2011/055208, filed Nov. 21, 2011, which international application claimed priority to U.S. Provisional Application No. 61/344,930, filed Nov. 22, 2010.

U.S. application Ser. No. 14/284,879, filed May 22, 2014, now U.S. Pat. No. 9,081,209, also claims the benefit under 35 U.S.C. § 119 of U.S. Provisional Application No. 61/826,127, filed May 22, 2013.

U.S. application Ser. No. 14/843,619, filed Sep. 2, 2015, also claims the benefit under 35 U.S.C. § 119 of U.S. Provisional Application No. 62/170,543, filed Jun. 3, 2015. The disclosures of all of these prior applications are incorporated herein by reference in their entirety.

INCORPORATION BY REFERENCE

All publications and patent applications mentioned in this specification are herein incorporated by reference in their entirety to the same extent as if each individual publication or patent application was specifically and individually indicated to be incorporated by reference.

BACKGROUND

The present invention relates to eyewear and in particular to Pince-Nez eyeglasses (i.e., two lens eyewear lacking temple pieces) that are comfortable, stable and have universal fit while still having full sized optics. The eyeglasses of this invention are also thin, light and easily stored.

There are over 40 million people in the US that use reading glasses known as readers. Current readers typically purchased in a drug store or other mass merchandisers are designed to fit most people by using the nose as a resting place. Since nose width, angle and shape vary considerably among users, standard readers achieve their stability via the temple pieces placed above and behind the user's ears.

Users wear readers at a different place down their nose in order to allow them to look over the lenses of the readers and to change the distance from the lens to the eye to adjust their effective power. The temple pieces of standard readers are usually long enough to accommodate these different positions without loss of stability of the eyeglasses on the user's face.

Most Pince-Nez eyeglasses apply a significant clamping force on the nose in order to stabilize the lenses on the wearer's face. To provide a universal fit, Pince-Nez eyeglasses should accommodate noses of varying sizes and shapes at varying wearing locations while maintaining stability without user discomfort. Many Pince-Nez eyeglass designs fail to meet this standard, however. For example, while attaching Pince-Nez eyeglasses on the pliable tissues over the nostrils might help attach the eyeglasses to any size nose, most users would find this attachment location to be uncomfortable because it restricts breathing, and the glasses would be too far away from the eyes.

Another common problem with readers is their availability when needed. While the temple pieces of standard readers can be folded toward the lenses to reduce the storage size of the eyeglasses, the temple pieces take up storage space, and the overall volume of the storage configuration of the readers may limit their accessibility. Because Pince-Nez eyeglasses do not have temple pieces, they present new opportunities for storage and accessibility.

SUMMARY OF THE DISCLOSURE

The present invention relates to universal Pince-Nez eyeglasses for use as readers and/or as sunglasses. The invention also relates to eyeglasses systems including eyeglasses and storage cases for the eyeglasses.

Eyewear and in particular reading glasses and sun glasses that are used episodically benefit from a compact, convenient carrying case that attaches to key chains, smart phones, clothing or placed in pockets or purses. The present invention provides a convenient way to automatically fold the glasses into a carrying case not much bigger than the area of one lens, or the thickness of the two thin folded lenses.

Many eyewear lenses are susceptible to scratching when the lenses are repeatedly rubbed against another hard object such as a case or the opposite lens. The present invention addresses this problem for such lenses typically made from polycarbonate by protecting them in a fully enclosed case and avoiding the optical surfaces from contact with another hard surface during the insertion and retrieval from the case.

Some eyewear such as sunglasses must be worn so the lenses cover the eyes in order to achieve the full benefit of such eyewear. In order to do so on highly varied nose widths among users, the Pince-Nez must bridge width must be continuously adjustable in order to accommodate each user while still allowing for it to fold the lenses over each other in order to be stored in the above mentioned case. Previous art, mostly antique Pince-Nez glasses, demonstrated folding fixed bridges and variable width spring loaded linear nonfolding bridges. The present application describes a Pince-Nez bridge capable of both functions.

One aspect of the invention provides an eyewear system including eyeglasses having first and second lenses; first and second nose pads; and a bridge operably connecting the first and second lenses, the bridge being bendable from a bridge rest position to permit relative movement between the first and second nose pads and providing a bridge pinch force of 50 g or less between the nose pads when the nose pads are moved 7 mm or less from the bridge rest position. In some embodiments, the first and second nose pads are operably connected to the first and second lenses, respectively, via connectors adapted to permit relative movement between the first and second nose pads and the first and second lenses, respectively, and providing first and second pad forces resisting relative movement between the first and second nose pads and the first and second lenses from rest positions, the first and second pad forces being less than the bridge pinch force. Throughout the disclosure, for brevity, the term "g" or "grams" may be used for "gram-force," which is equal to 0.00980665 Newtons. The first and second nose pads may each have a cantilever extending from its respective connector. In some embodiments, the bridge force is a spring force having a spring constant greater than a spring constant of the cantilever of the first nose pad and the second nose pad.

In some embodiments, the nose pads are adapted to exert less than 150 g/cm² of pressure on a nose of a user when the eyeglasses are mounted on the nose. The nose pads may each include friction material, such as fine grit or a material having a friction coefficient less than 3.5.

Some embodiments of the eyewear system also include a case adapted to receive the eyeglasses, the case and eyeglasses being sized so that the bridge bends from its rest position when the eyeglasses are within the case. The bridge may be adapted to provide a retention force between the eyeglasses and the case when the eyeglasses are disposed within the case. In some embodiments, the case may also have offset frame guides sized and configured with respect to the eyeglasses to engage and fold the eyeglasses as the eyeglasses are inserted into the case.

In some embodiments, the case may also have a locking element adapted to hold the eyeglasses within the case. The case may also have an opening adapted to receive the eyeglasses, the locking element being disposed to block the opening in a first position and to permit access to the opening in a second position. The case may also have a rotatable connection adapted to permit the locking element to rotate between the first position and the second position.

In some embodiments, the case also has a keychain connector. The keychain connector may be disposed on the locking element.

In some embodiments, the bridge of the eyeglasses has an adjustable at-rest length. In some embodiments the bridge may be connected to the first and second lenses. The bridge may also include first and second adjustable connectors adapted to move with respect to the first and second lenses, respectively, to change an effective length of the bridge.

In some embodiments, the first and second nose pad connectors are connected to the first and second optical lenses, respectively. In some embodiments, the first and second nose pad connectors are adjustable to change a width between the first and second nose pads.

A first aspect of the invention provides an eyewear system including eyeglasses and a case, the eyeglasses having a first lens, a second lens, and a bendable bridge disposed between the first lens and second lens, the bendable bridge having a spring providing a spring force when the bridge is bent from a rest position, the eyeglasses being adapted to move from a wearable configuration in which the first and second lens do not overlap to a stored configuration in which the first and second lenses at least partially overlap, the bendable bridge being bent from its rest position in the stored configuration, the case having an opening through which the eyeglasses pass during insertion and guides sized and configured with respect to the eyeglasses to engage and fold the eyeglasses against spring force of the bridge to the stored configuration during insertion of the eyeglasses through the opening and into the case.

In some embodiments, the guides include a first guide having a first bearing surface adapted to engage a first side of the eyeglasses and a second guide having a second bearing surface adapted to engage a second side of the eyeglasses opposite to the first side during insertion of the eyeglasses into the case. The first bearing surface may be on a first side of the opening, and the second bearing surface may be on a second side of the opening opposite to the first side. In some embodiments, the first guide may further include a first tapered surface adapted to move the first lens toward a bottom portion of the case, and the second guide may further include a second tapered surface adapted to move the second lens toward a top portion of the case during insertion of the eyeglasses into the case. In some embodiments, the guides are offset from each other.

In some embodiments, the case further includes a clasp with an engagement surface sized and shaped to engage the bendable bridge of the eyeglasses and an actuator adapted to move the clasp from a first position near the opening in the case to a second position within the case away from the opening, wherein movement of the clasp from the first position to the second position while the clasp is engaged with the bendable bridge of the eyeglasses is operative to move the eyeglasses into the stored configuration. The actuator may include, e.g., a button on an outside surface of the case and movable within a slot within the case. Some embodiments also have an optional first stop element positioned to hold the clasp in the first position and an optional second stop element positioned to hold the clasp in the second position.

In some embodiments, the clasp further includes a retention portion shaped to retain the bendable bridge of the eyeglasses within the case. The clasp may also have an opening and a bendable portion adapted to bend the retention portion from a first position in which the opening permits insertion of the bendable bridge and a second position in which the retention portion retains the bendable bridge. In some embodiments, the retention portion moves from its first position to its second position as the clasp moves from its first position to its second position.

In some embodiments, the case further includes a first internal surface adapted to engage a first side of the eyeglasses associated with the first lens in the stored configuration and a second internal surface adapted to engage a second side of the eyeglasses associated with the second lens in the stored configuration, the spring force of the bridge spring providing a retention force between the eyeglasses and the case.

In some embodiments, the eyeglasses also have a bridge carrier disposed between the bridge and the first lens providing an adjustable effective length of the bendable bridge with respect to the first and second lenses. The eyeglasses may also have a second bridge carrier disposed between the bendable bridge and the second lens and operable with the first bridge carrier to adjust the effective length of the bendable bridge with respect to the first and second lenses.

Another aspect of the invention provides a method of storing eyeglasses in a case, the eyeglasses having a first lens, a second lens, and a bendable bridge disposed between the first lens and second lens, the bendable bridge having a spring providing a spring force when the bridge is bent from a rest position. In some embodiments, the method includes the following steps: moving the eyeglasses through an opening into the case; and engaging first and second sides of the eyeglasses with first and second guides during the moving step to bend the bendable bridge against its spring force to fold the eyeglasses into a stored configuration in which the first and second lenses at least partially overlap within the case.

Some embodiments include the step of moving the first lens toward a top portion of the case and moving the bottom lens toward a bottom portion of the case.

Some embodiments of the method include the step of engaging the bendable bridge with a movable clasp in the case. The method may also include the step of moving the clasp away from the opening after engaging the bendable bridge such as by, e.g., sliding an actuator. The method may also include the step of engaging the clasp with a stop element to hold it in position.

In some embodiments, the step of engaging the bendable bridge with a movable clasp includes the step of inserting the bendable bridge through an opening in the movable clasp, the method further comprising closing the clasp opening to retain the bendable bridge in the clasp.

Another aspect of the invention provides Pince-Nez eyeglasses having a first lens, a second lens, a bendable bridge comprising Nitinol wire disposed between the first second lenses, and first and second disposed between the first and second lenses, the bendable bridge and the nose pads cooperating to support the Pince-Nez eyeglasses on a user's face without temple pieces. In some embodiments, the Pince-Nez eyeglasses also include a frame at least partially surround the first lens and the second lens. In some such embodiments, the nose pads and/or the bendable bridge may extend from the frame.

In some embodiments, the first lens and the second lens each are made at least partially from polycarbonate. In some embodiments, the first lens and the second lens are each a full size lens. In some embodiments, the nose pads each have a thickness no larger than a thickness of the first lens or the second lens, and in other embodiments, the nose pads each have a thickness greater than a thickness of the first lens and a thickness of the second lens. In some embodiments, the nose pads each comprise a friction material.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
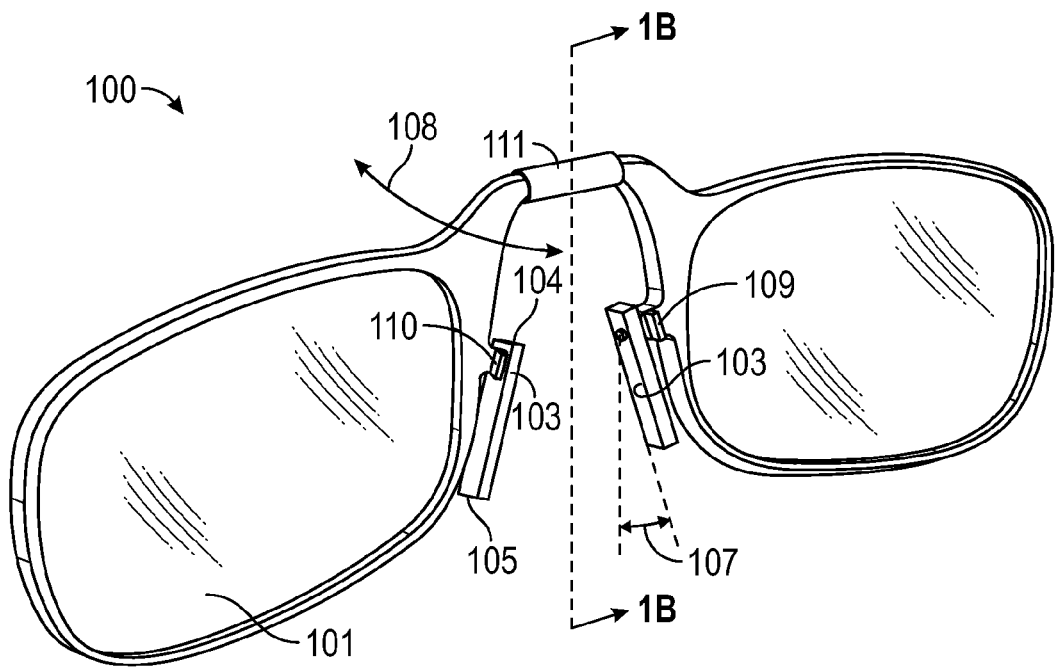
FIG. 1A is a perspective view of Pince-Nez eyeglasses according to one embodiment of the invention.

Prior art Pince-Nez eyewear (see wwwdotendotwikipediadotorg/wiki/Pince-nez) typically utilize nose pads that are directly or indirectly attached to the lenses or lens frame. As a result, any changes to the distance between nose pads affect the distance between the lenses and their angular orientation and position with respect to the eyes, which can induce optical prism, introduce error in the optical cylinder axis or affect the lens aesthetics. The varying distance between the nose pads of prior art Pince-Nez eyewear further changes the nose clamp spring force, resulting in an inconsistent pinch force for different users, an unstable fit for some and discomfort for others. The large pinch force can also lead to tissue ischemia, adding to user discomfort.

The present invention provides eyeglasses that are comfortable and stable on noses of nearly all sizes and shapes. Typical reading glasses weigh over 20 g, even foldable compact versions (e.g., MicroVision) with smaller lenses weigh over 14 g. It will be appreciated that in a Pince-Nez design, the weight of the eyewear is important for both stability on the nose and comfort. Heavier eyewear without ear pieces requires more clamping force to maintain stability on the nose because of the increased weight and the increased mechanical moment which causes instability when the user moves their head up and down or from side to side. Since the clamping force translates to pressure exerted by the nose pads on the tissue, a larger clamping force can lead to user discomfort, pain and in extreme cases, tissue ischemia. Thus, in some embodiments, the eyeglasses reduce the pinching pressure required to maintain a stable position by reducing the mass of the full size optics and hence reducing inertia caused by head movement and gravitational pull and increase the area of the thin nose pads to distribute the force and hence reduce the pressure further.

In addition, some embodiments of the eyewear of this invention optionally increase the friction between the eyewear and the nose skin by utilizing novel nose pad materials.

Such eyewear further reduces the clamping force required for stability while reducing the force causing slippage off the nose.

Some embodiments of the Pince-Nez eyewear of this invention provide the nose pinch force with a super elastic bridge spring whose force does not change significantly as a function of nose width. For example, the eyewear may employ thin super elastic alloy wire made from Nitinol to interconnect the lenses (referred to herein as a lens bridge). A superelastic bridge allows repeated transformation from a worn position to a folded position for storage while exerting repeatable, controlled and nearly constant low pinch force for varying bridge deformation cause by varying width noses during wear. This feature combined with use of thin molded polycarbonate lenses results in Pince-Nez reading eyewear a large viewing zone for reading comfortably without lens distortion and without the usability compromises often inflicted by compact reading glasses.

Some embodiments of the Pince-Nez eyewear of this invention provide elongated thin nose pads or folding nose pads whose specific separation distance allows the top of the pad to engage the nose via the force created by bridge spring while the bottom of the nose pad can flex or pivot to accommodate different nose angles and thus prevent the glasses from tipping forward.

One embodiment of the eyeglasses of this invention is shown in FIG. 1. The eyeglasses 100 include full sized lenses 101 over molded on a nitinol wire bridge 102 (NDC, Fremont Calif.) with diameter of 0.010" to 0.030" (e.g., 0.020") covered with an elastomer 111. The lenses may be clear optical lenses for reading glasses or tinted sunglass lenses.

Figure 1B:
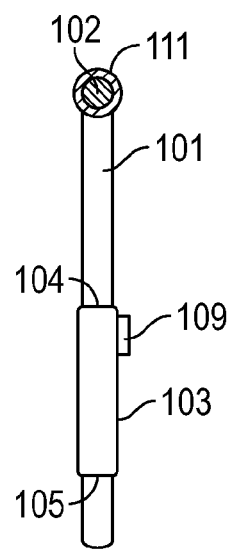
FIG. 1B is a cross-sectional view taken along the line B-B shown in FIG. 1A.

In the embodiment shown in FIGS. 1A and 1B, the lenses 101 are molded polycarbonate optical lenses less than 3 mm thick weighing less than 5 grams for 2.5 diopter full sized reading glasses with lens optical area of over 9 cm$^2$. For lower optical powers or smaller optical area, the lens thickness and reader's weight can be reduced even further. For sunglasses or 3D glasses with no optical power the lenses can be less than 2 mm thick for any optical zone.

The lenses 101 are attached to the super elastic bridge 102, as shown. In alternative embodiments, the lenses can be attached to a frame, with the bridge forming part of the frame or extending between two frame sections.

In the illustrated embodiment, the eyeglasses have nose pads 103 that are no wider than the lens thickness. In this embodiment, the nose pads 103 are 13 mm long (+/−4 mm). Nose pads 103 are attached to the lenses 101 (or, if there is an optional frame, to the frame) at their upper ends 104 and are free at their lower ends 105 to form cantilevers extending downward. In one embodiment, there is a 12 mm (+/−3 mm) separation between the tops 104 of the nose pads 103, and the nose pads 103 extend downward at an angle 107 of 18°+/−4° from the vertical in their rest positions.

In some embodiments, the nose pads are formed from a flexible material, such as 0.005-0.020" (e.g., 0.010") inch thick polycarbonate. In such embodiments, the nose pad material, shape and cantilever connection permit the nose pads 103 to bend with a spring constant that is less than the spring constant of the bridge 102. The nose pads 103 can therefore flex to accommodate the nose geometry while permitting the entire nose pad to maintain contact with the nose.

In some embodiments, a 10 mm long super elastic bridge 102 exerts a pinch force measured at the tops 104 of the nose pads 103 of less than 10 g on a narrow nose width of 12 mm, and less than 50 g (0.05 N) on a large nose width of 19 mm (all measurements +/−20%), as it flexes through angle 108 to accommodate various width noses. The 13.5 mm long nose pads 103 are 2 mm wide providing a total area of 0.24 cm$^2$ and thus average pressure well less than 150 g/cm$^2$.

The nose pads 103 may have an optional friction material (e.g., laminated onto an elastic member, such as the polycarbonate described above) to further increase the stability of the eyeglasses on the nose by minimizing slippage force due to the component of the pinch force along the surface of the skin and rotation moment due to the eyeglasses' center of mass. The friction can be created by low durometer elastomers such as 3M grip tape (GM613, 3M MN, ASTM 1894 coefficient of friction measured against the same material of less than 3.5), silicone, open cell polyurethane, or micro texture sufficient to grip the skin but not to cause discomfort such as textured polymer (polycarbonate embossed with micro machined or micro molded texture) or micro grit impregnated surface (60-400 grit).

Figure 2:
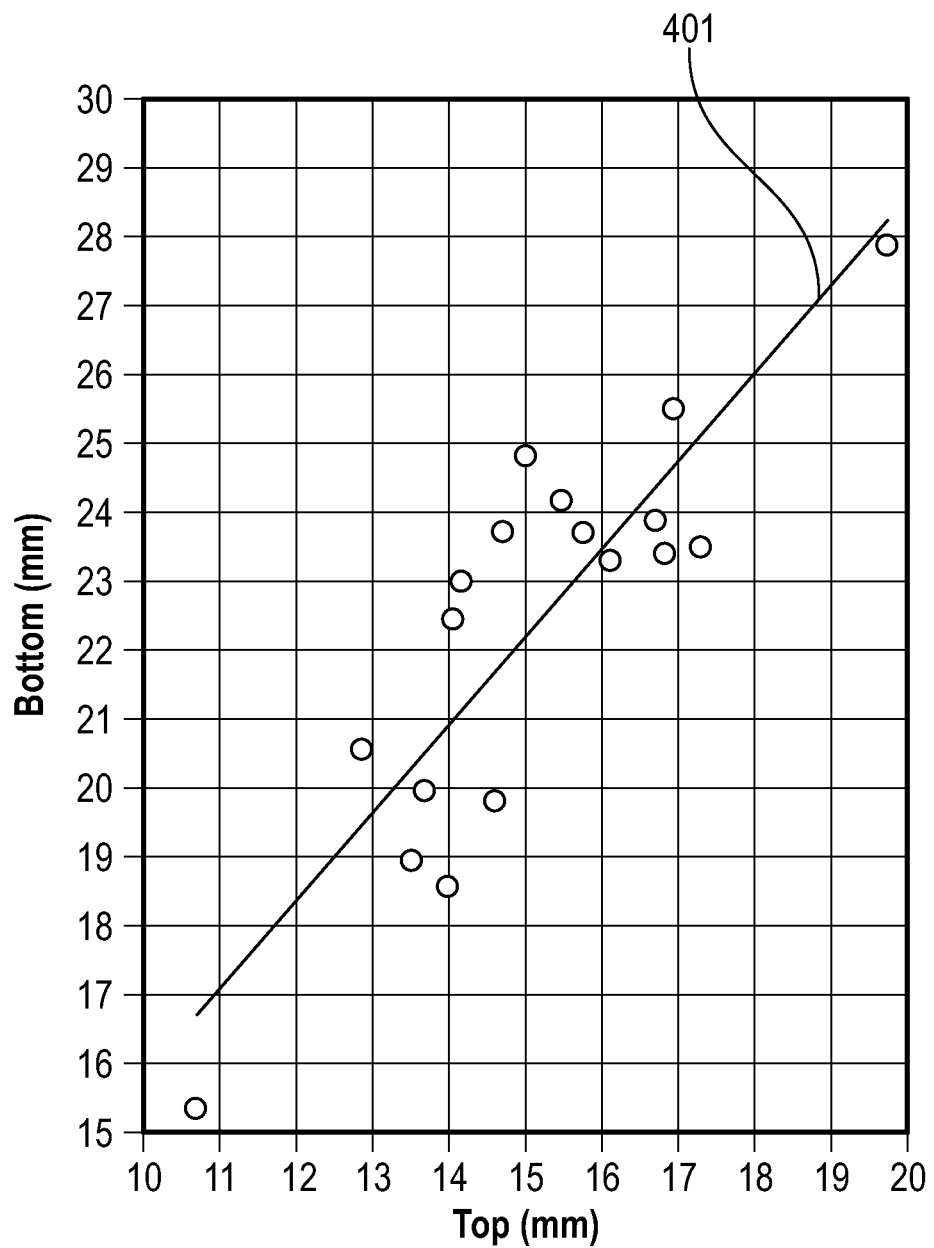
FIG. 2 plots the distance between the tops of the nose pads versus the distance between the bottoms of the nose pads for a variety of users wearing the eyeglasses of FIGS. 1A and 1B.
Figure 3:
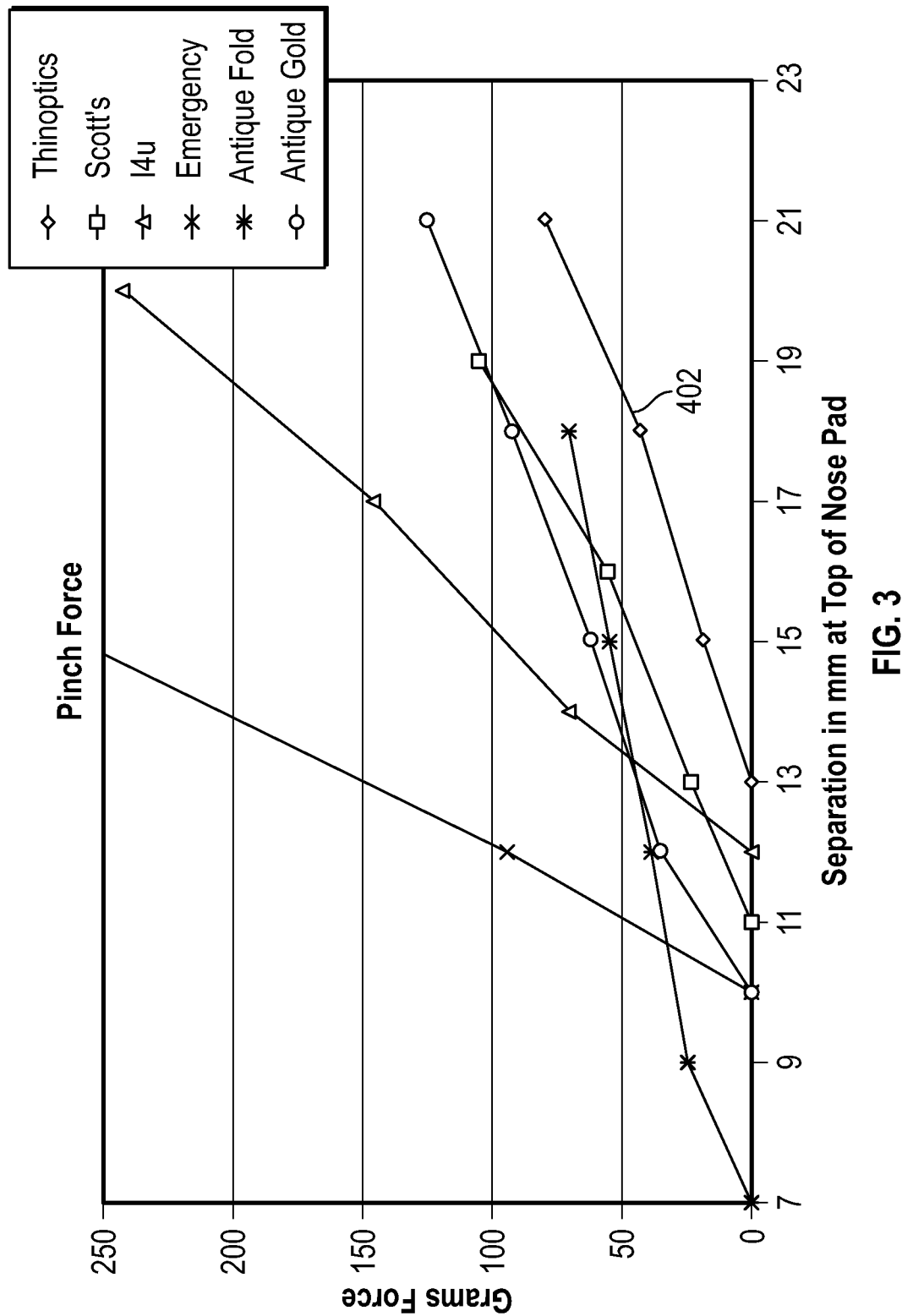
FIG. 3 compares the nose pinch force provided by a variety of Pince-Nez eyeglasses.

Test data comparing various Pince-Nez eyeglass designs are shown in FIGS. 2 and 3. FIG. 2 plots the distance (as determined by optical measurements) between the tops 104 of the nose pad 103 versus the distance between the bottoms 105 of the nose pads 103 for a variety of users (having a variety of nose sizes and shapes) each wearing the eyeglasses embodiment shown in FIGS. 1A and 1B. The average top distance was 16.1 mm (STD 2.4 mm) with a range of 10.6-19.8 mm and a bottom distance of 23.9 mm (STD 3.1) with a range of 15.4-27.9 mm. As can be appreciated from the linear regression line 401, no one line can be drawn so that all the users would experience proper fit. These measurements were made with the test frame positioned on the appropriate location on the nose bridge; in practice, users vary the location of the eyeglasses on their nose based on the task which adds further variability to the data. As observed in many fit studies, if the bottoms of the nose pads contact the nose while the top pads do not due to the angle and separation, the bottom contact point becomes a pivot point and the glasses easily tip over and fall off the face when the user tilts their head downward to read a tablet or menu. If the top of the nose pads contacts the nose, it becomes the pivot point and the glasses tip over making them no longer perpendicular to the visual axis compromising their usefulness.

FIG. 3 compares the nose pinch force (measured at the top of the nosepads) provided by a variety of Pince-Nez eyeglasses. The embodiment shown by FIGS. 1A and 1B is represented by line 402. As can be seen, the eyeglasses of this invention provide lower pinch forces than the other eyeglasses tested across a range of nose sizes.

Figure 4:
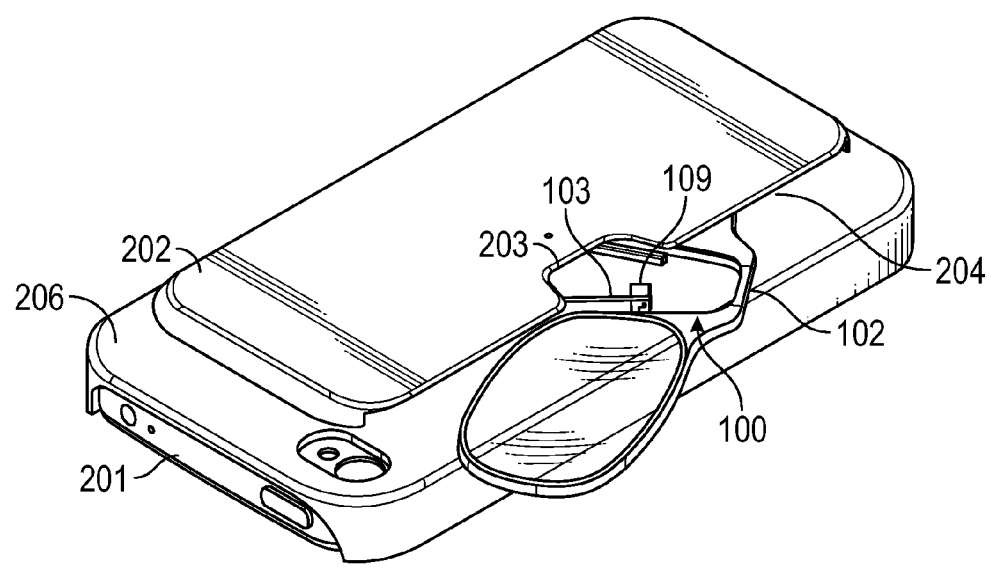
FIG. 4 is a perspective view of an embodiment of eyeglasses and case according to another embodiment of the invention in which the eyeglasses are stored flat.
Figure 8:
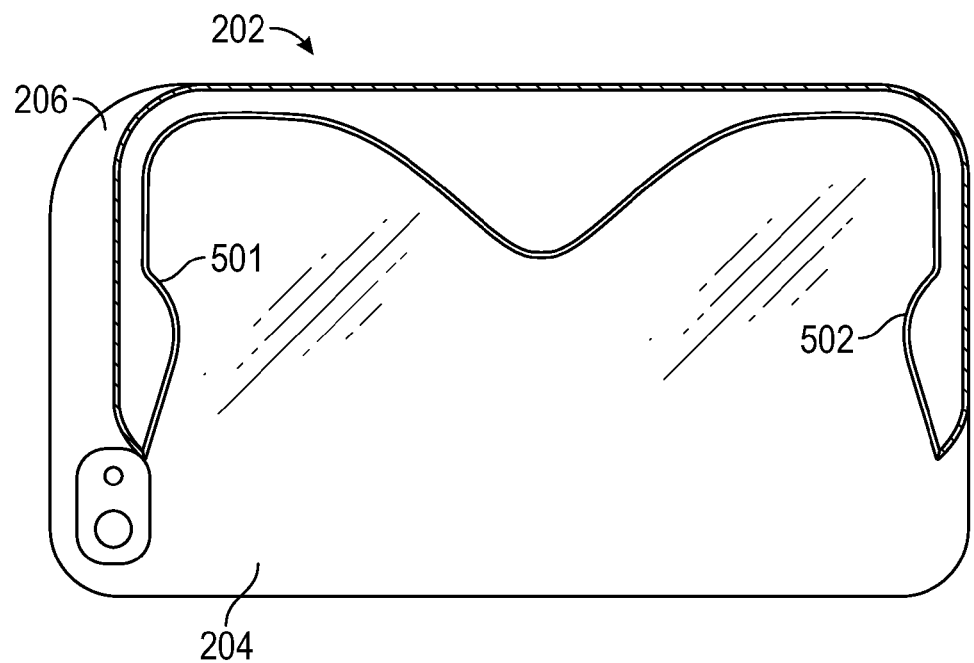
FIG. 8 is sectional view of the case of FIG. 4 without the eyeglasses.

In some embodiments, the eyeglasses are designed to fit in compact storage cases, as discussed in more detail below. For example, the embodiment shown in FIGS. 1A and 1B may be stored flat in a case 202 extending from a housing 206 designed to be attached to the back of a cell phone 201, as shown in FIG. 4. Case 202 has an opening 204 at its top into which the eyeglasses 100 may be inserted. In some embodiments, the eyeglasses 100 are slightly longer than the case 202, and the eyeglasses are therefore bent at the bridge 102 during insertion. In such embodiments, the spring action of the bridge 102 may help retain the eyeglasses in the case. Optional retention features, such as surfaces 501 and 502, may be provided inside the case to hold the eyeglasses within the case, as shown in the cut-away view of FIG. 8. In this optional embodiment, the eyeglasses bend at bridge 102 as they are inserted through opening 204 into case 202, then unbend slightly as the lenses pass surfaces 501 and 502. Likewise, to remove the eyeglasses from case 202, the eyeglasses bend at bridge 102 when the lenses move toward each other as the eyeglasses are pulled through opening 204.

An optional cut-away portion 203 may leave the bridge 102 exposed after insertion so that the eyeglasses may be easily extracted from the case. In some embodiments, protruding portions of the eyeglasses (such as, e.g., features 109 and 110 shown in FIGS. 1A and 1B) may provide a friction fit between the eyeglasses 100 and the inside of case 202. In some embodiments an internal storage volume of the case 202 is less than 14 cm$^3$ for a full 40 mm wide optical zone 2.5 diopter readers stored flat as shown in FIG. 4, and the case 202 is less than 4 mm thick.

Figure 5:
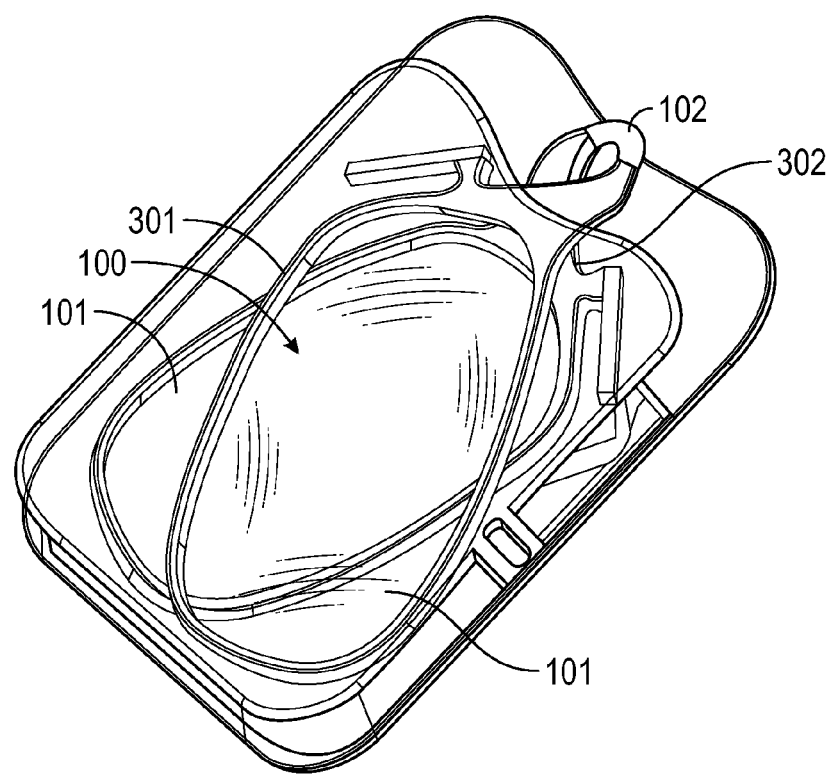
FIG. 5 is an elevational view of an embodiment of eyeglasses and case according to another embodiment of the invention in which the eyeglasses are stored in a folded configuration.
Figure 6:
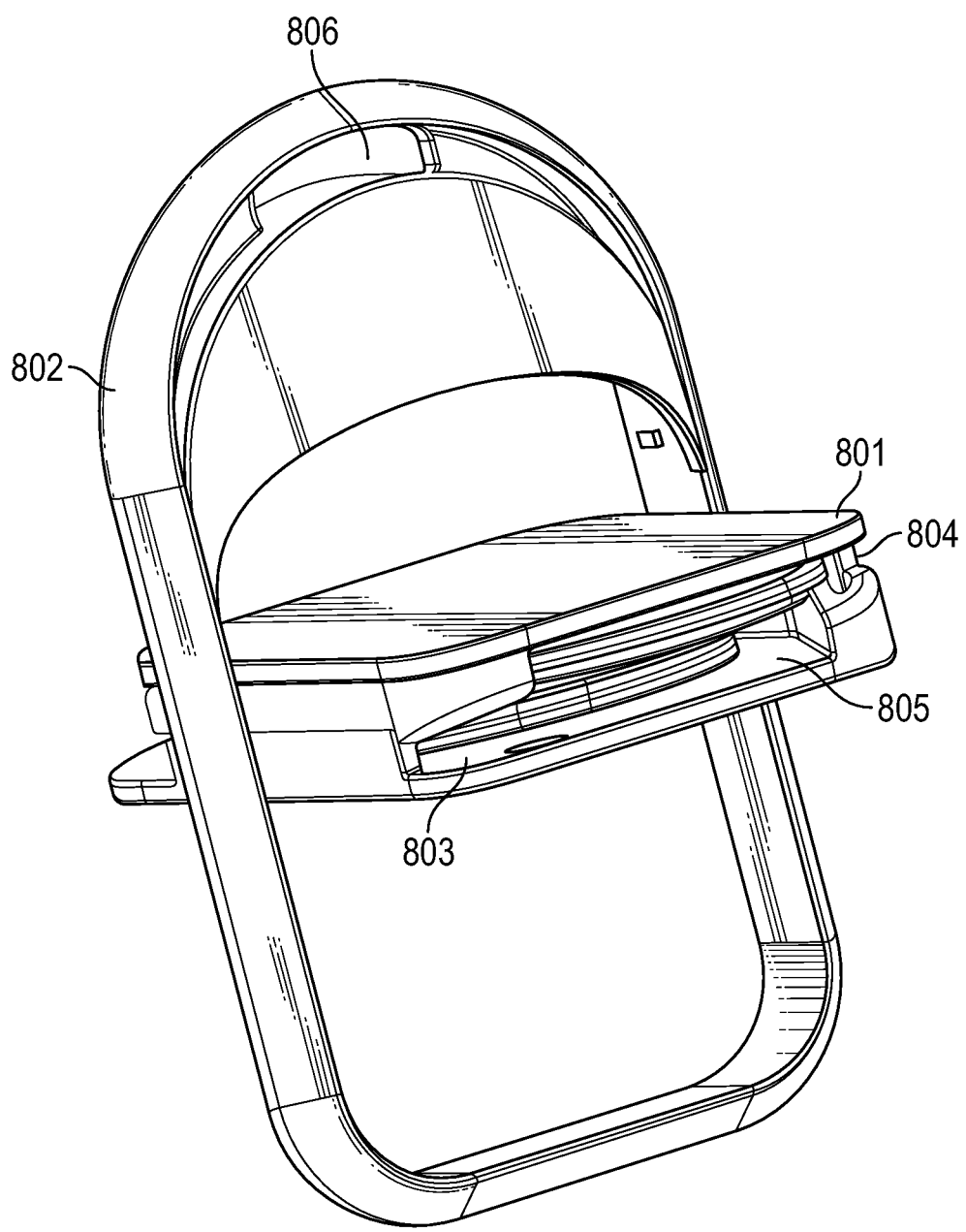
FIG. 6 is a perspective view of an embodiment of eyeglasses and case according to yet another embodiment of the invention in which the eyeglasses are stored in a folded configuration.
Figure 7:
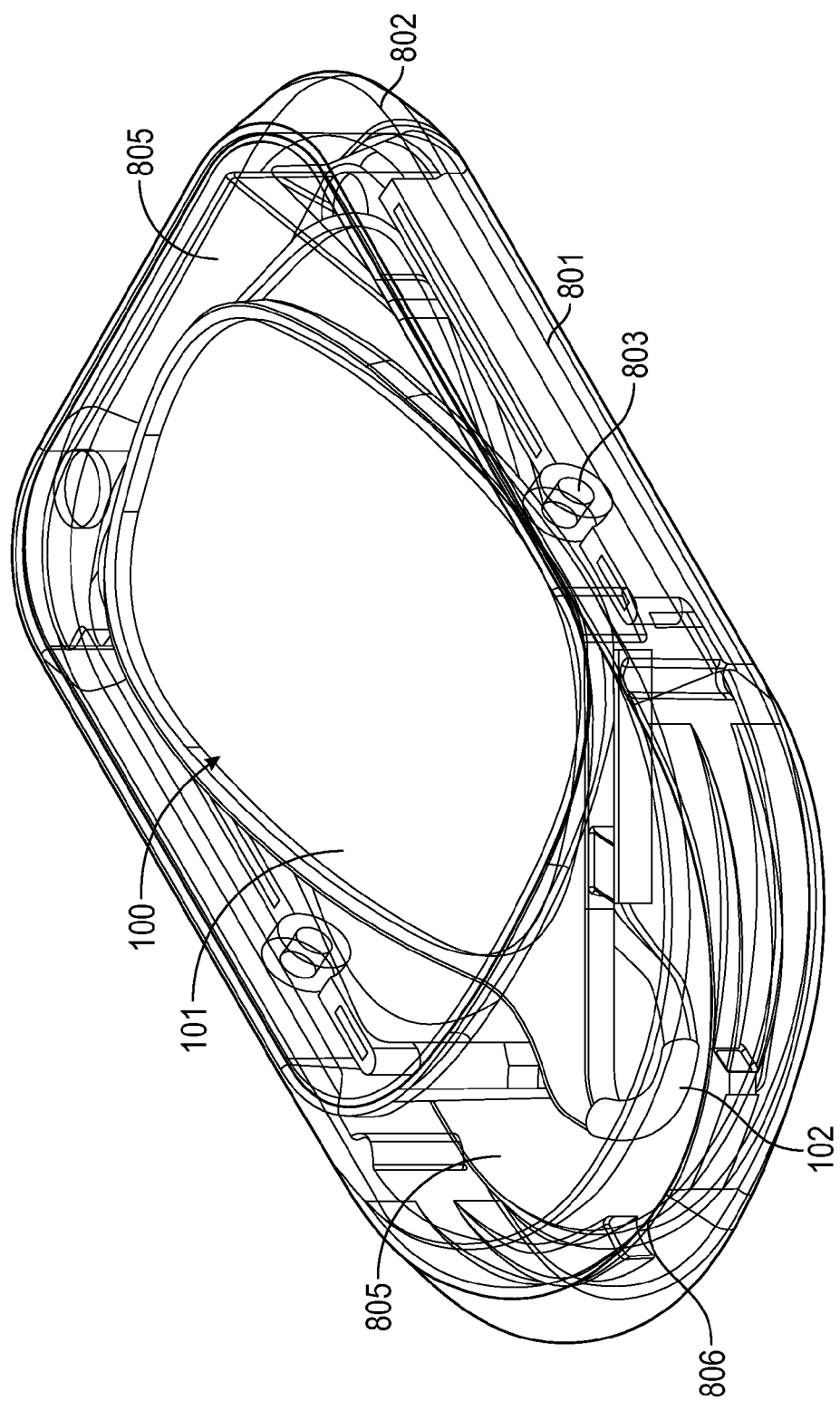
FIG. 7 is a perspective view of the embodiment of FIG. 6 with the locking band in a locked position.

FIGS. 5-7 show embodiments of Pince-Nez eyeglass cases in which the eyeglasses are folded for storage. In FIG. 5, the eyeglasses 100 are bent at the bridge 102 to place one lens 101 over the other lens 101. Eyeglasses 100 may be inserted through an opening 302 on one end of the case 301. The spring force of the superelastic bridge 102 and the friction fit between the eyeglasses and the interior of the case 301 maintain the position of eyeglasses 100 within case 301. Bridge 102 extends through opening 302 as shown to provide structure to grab for removal of eyeglasses 100 from case 301. In this embodiment, the case 301 may be only 9 mm thick or less.

In the embodiments of FIGS. 6 and 7, eyeglasses 100 may be inserted through an opening 804 for storage within an eyeglass case 801. A locking band 802 rotates around pivot 803 to open the case 801 (as shown in FIG. 6) or close it (as shown in FIG. 7). Bridge 102 may be inserted first, as shown, and a pair of optional offset guides 803 and 804 help move the one lens 101 over the other lens 101 as the eyeglasses are advanced into case 801. An optional keychain hook 806 may be provided for attachment of the case to a keychain or other holder. The expanding force of superelastic bridge 102 causes the eyeglasses to move against the internal surfaces of the case and helps retain the eyeglasses in the case.

Figure 9:
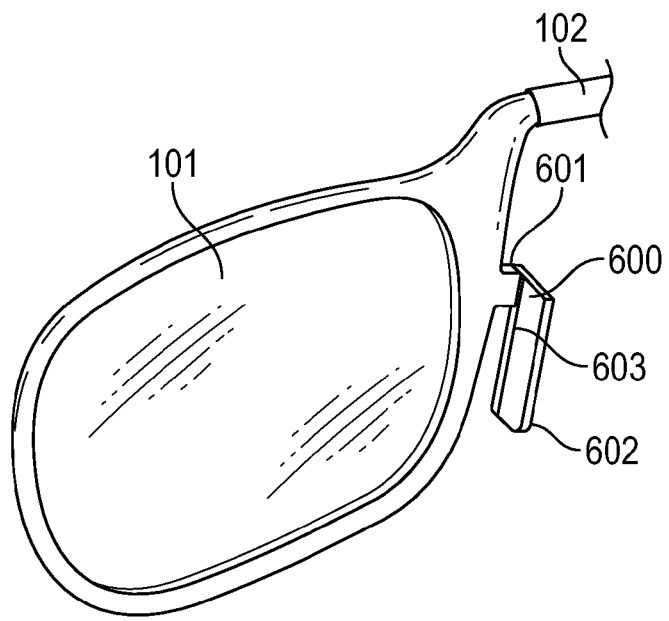
FIG. 9 is a partial perspective view of yet another embodiment of the eyeglasses of this invention.

An alternative embodiment of the eyeglasses is shown in FIG. 9. In this embodiment, the nose pads 600 are wider than the thickness of the lens 101. The nose pads therefore are designed to fold for storage. For eyeglasses intended to be stored flat, the nose pads must fold to a thickness equal to or less than the thickness of the lenses. For eyeglasses intended to be stored in a folded configuration, the nose pads must fold to a thickness equal to or less than the combined thicknesses of the two lenses.

For example, as shown in FIG. 9, the nose pad 600 is formed from a laminate 602 made from friction enhancing material and polycarbonate (0.01" thick) and is attached to the bridge 601 at the top point. Nose pad 600 offers the same spring action described above (i.e., it has a spring constant less than the spring constant of bridge 102) but distributes the pinch force over a larger area. When stored, the nose pad folds along line 603 to become flat.

Figure 10:
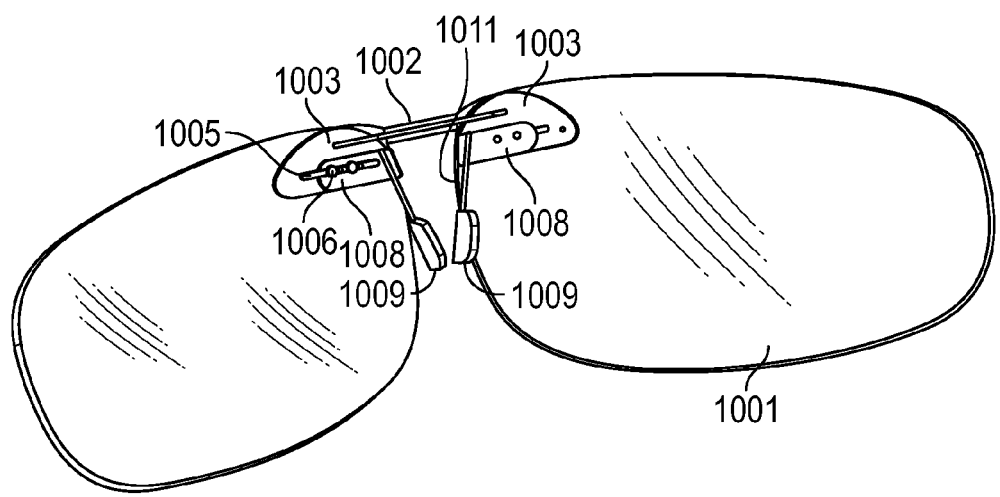
FIG. 10 is a perspective view of another embodiment of the eyeglasses of this invention.

Yet another configuration is shown in FIG. 10. Eyeglasses 1000 have lenses 1001 connected by a superelastic bridge 1002. Nose pads 1009 with friction material facing the nose are connected to the lenses 1001 by nose pad carriers 1008 and super elastic torsion members such as nitinol wires 1011 (0.02" diameter or less) and fold into the plane of the lenses when the lenses are inserted into a case or are folded flat against each other. The torsion element provides the spring force to engage the nose with the pad as well as torsion force to restore this orientation when withdrawn from a case thus making the glasses ultra compact and easy to store and carry.

The embodiment shown in FIG. 10 may be full size sunglasses having a 62 mm wide optical zone and weighing less than 7 g. The sunglasses may be stored in a flat configuration or in a folded configuration, as described above, in a case with an internal volume less than 10 cm$^3$.

The embodiment of FIG. 10 also provides adjustable positions for the bridge 1002 and nose pads 1009 to accommodate a range of nose sizes for a comfortable and secure fit. Superelastic nitinol bridge 1002 is attached to two thin bridge carriers 1003 that can slide on the back surface of the lenses. Plastic or metal rivets 1006 whose heads are trapped by holes on the front of each lens penetrate serrated channels 1005 in the carriers 1003. The rivets are attached to the nose pad carriers 1008 so that as the lenses are pushed toward each other the nose bridge narrows to accommodate narrower noses.

Figure 11:
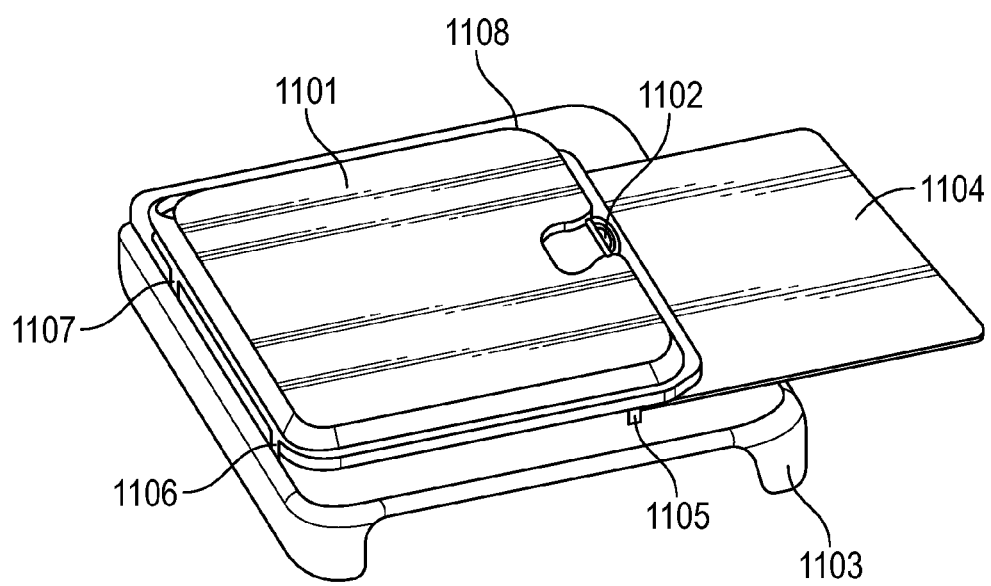
FIG. 11 is a perspective view of yet another case for use with eyeglasses according to this invention.

FIG. 11 shows yet another embodiment of a flat glasses case 1101 attached to a housing 1103 via elastic connections 1105, 1106, 1107, and 1108. Housing 103 may be designed to attach to a cell phone. Elastic connections 1105-1108 permit the distance between case 1101 and housing 1103 to be increased to allow the user to use the space between the glasses case 1101 and the housing 1103 as a compact wallet carrying money, ID or credit cards 1104.

FIGS. 12-20 illustrate an eyewear system including bendable eyeglasses and a case for the holding the eyeglasses according to another aspect of the invention. Case 1200 has a top portion 1202 and a bottom portion 1204. An optional opening 1206 through the top and bottom portions of the case provides a way to hang the case from, e.g., a keyring. An actuator 1208 extends through, and is movable along, a groove 1210 in the top portion 1202 of case 1200 and is operably connected to a clasp 1212 in the interior of case 1200. An opening 1214 in one end of the case is sized and configured to receive eyeglasses 1216 for storing in the interior of case 1200. Eyeglasses 1216 are substantially as described above and include a first lens 1218, a second lens 1220 and a bendable bridge 1222. The eyeglasses may also have nose pieces 1219 as described above.

Figure 12:
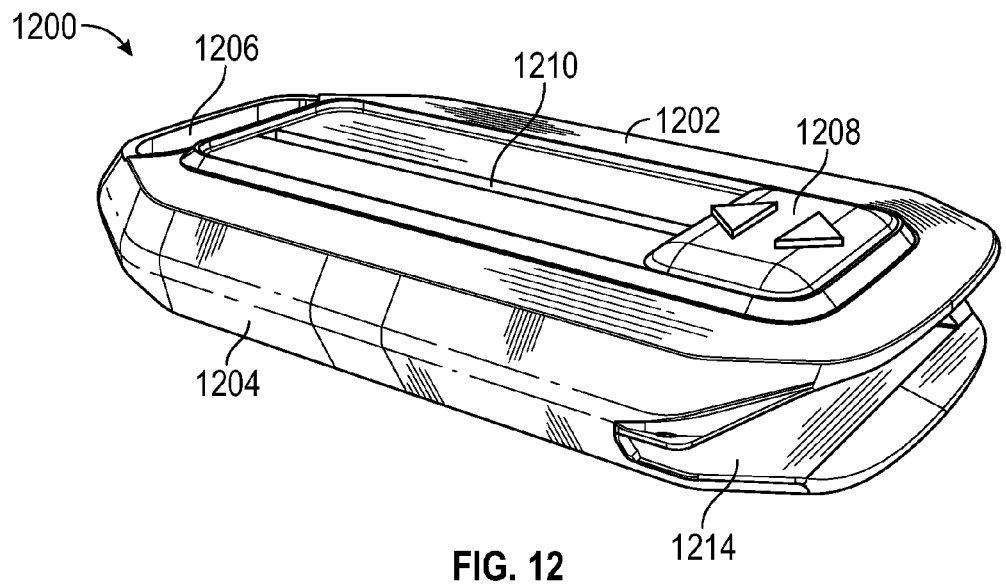
FIG. 12 is a perspective view of an eyeglasses case according to another aspect of this invention.
Figure 13:
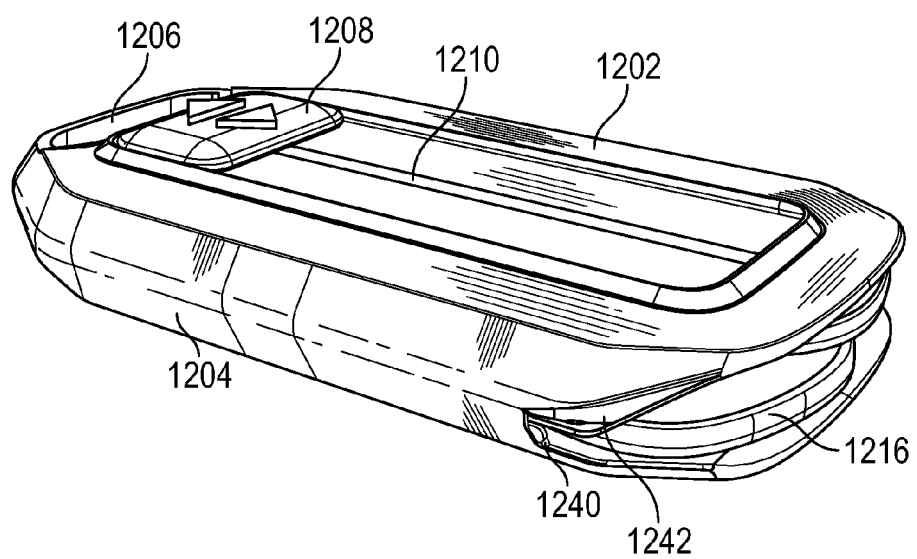
FIG. 13 is a perspective view of the eyeglasses case of FIG. 12 storing eyeglasses of this invention.
Figure 14:
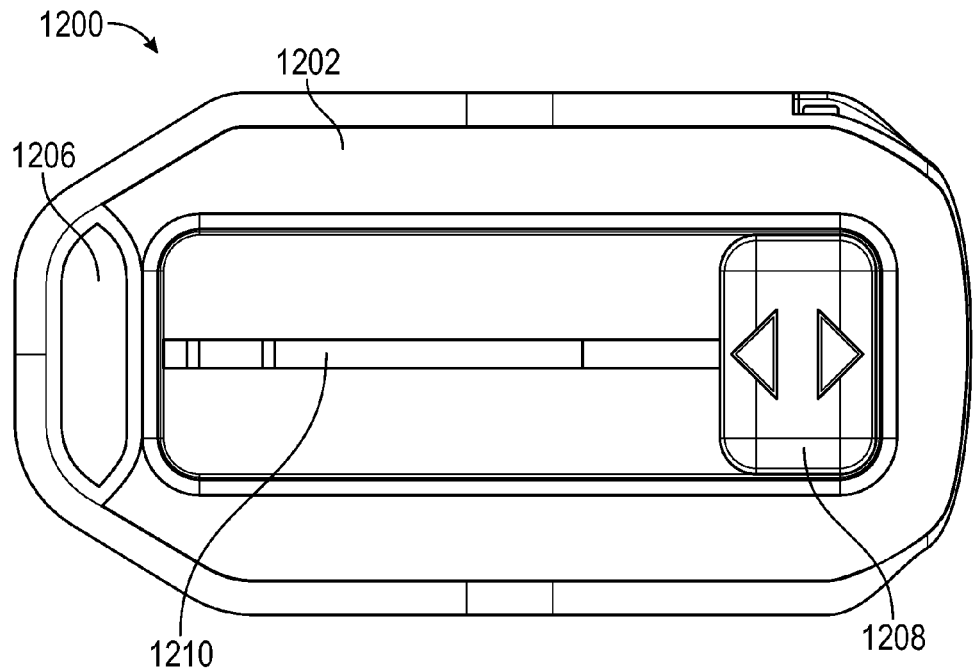
FIG. 14 is a top elevational view of the eyeglasses case of FIG. 12.
Figure 15:
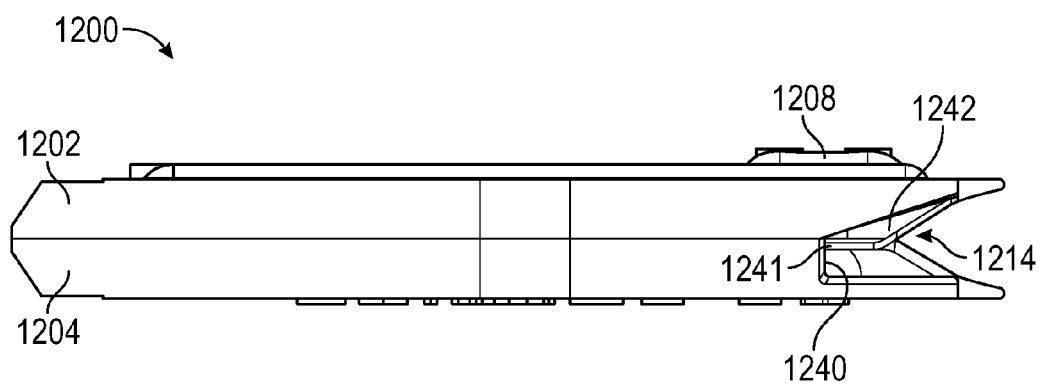
FIG. 15 is a side elevational view of the eyeglasses case of FIG. 12.
Figure 20:
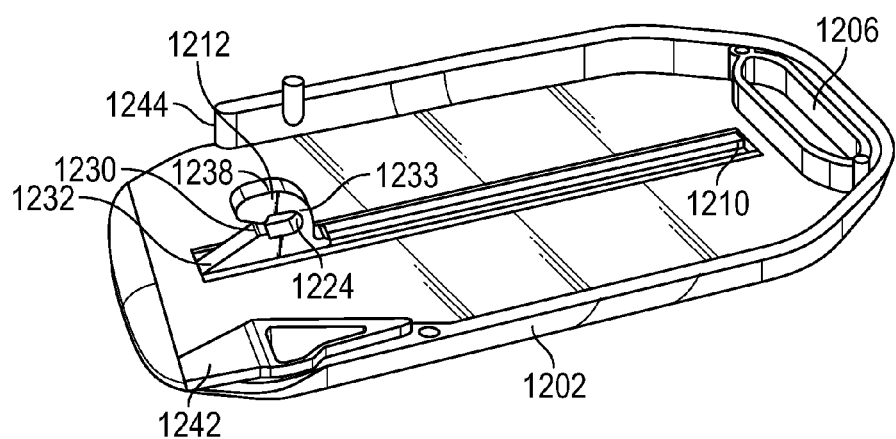
FIG. 20 is a perspective view of the top half of the eyeglasses case of FIG. 12.
Figure 21A:
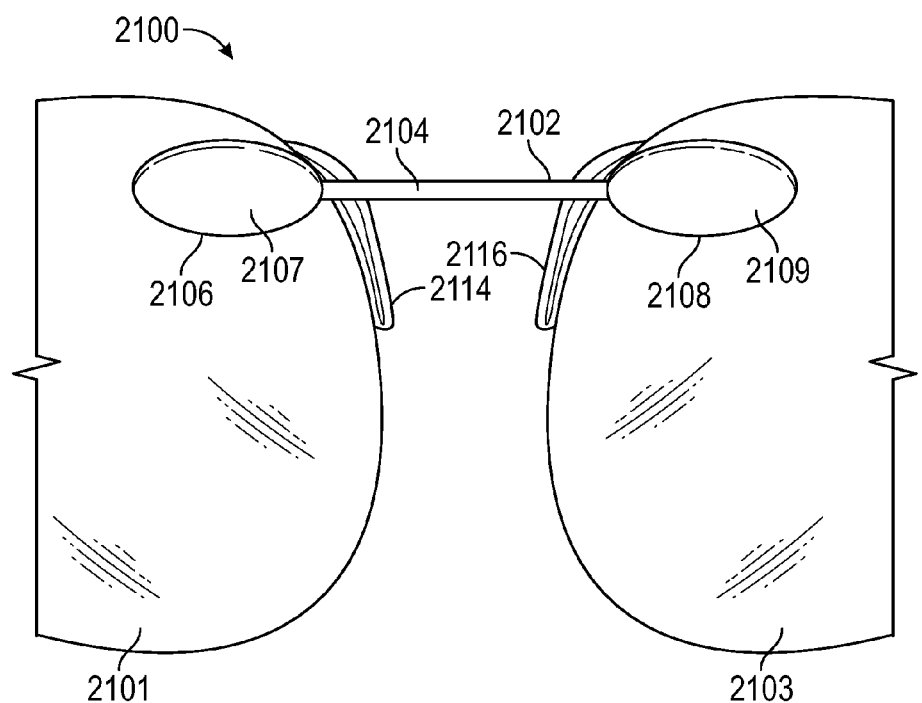
FIG. 21A is an elevational view of a portion of eyeglasses according to another embodiment of the invention.
Figure 21B:
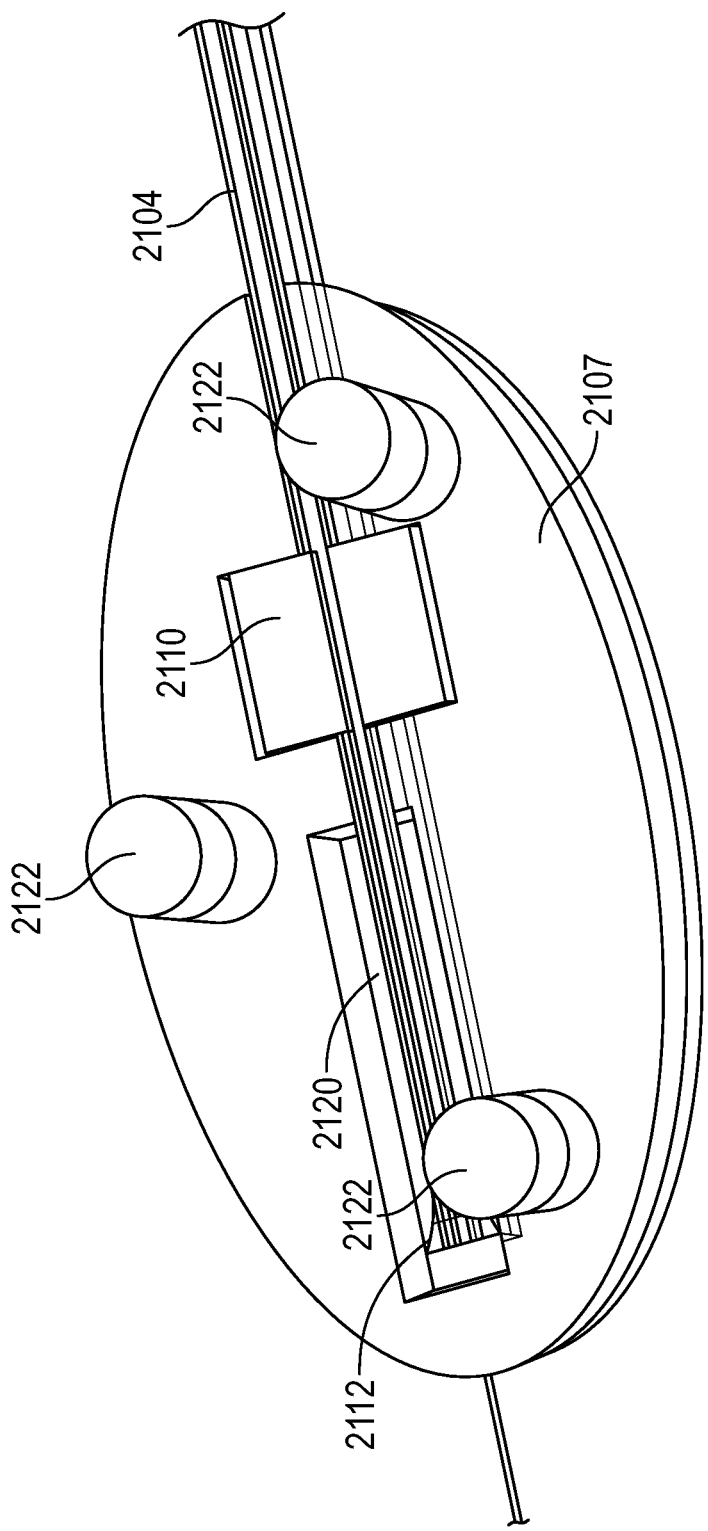
FIG. 21B is a detail of a portion of the eyeglasses of FIG. 21A.

In the configuration shown in FIGS. 12 and 20, actuator 1208 is in its forward-most position, which places clasp 1212 adjacent opening 1214. As shown in FIG. 20, clasp 1212 has an engagement surface 1224 adapted to engage the bendable bridge 1222 of eyeglasses 1216. An opening 1230 on the front side of clasp 1212 provides access to the engagement surface 1224, and a ramp 1232 helps move the bridge 1222 through opening 1230 toward the engagement surface 1224. Optional detents 1234 and 1236 are formed in the interior surface of bottom portion 1204 to serve as stop elements for the clasp 1212 in its most forward and most retracted positions to prevent unintended release of the eyeglasses. Clasp 1212 is formed from polycarbonate or other polymer, and has a thinner portion 1233 that bends upon engagement of a bottom edge 1238 of the clasp (shown as the top in the inverted view of FIG. 20) with the interior surface of the lower portion 1204 of the case. When actuator 1208 and clasp 1212 are moved away from opening 1214, the bottom edge 1238 of clasp 1212 moves out of detent 1234, and it enters detent 1236 when the clasp is fully retracted. In some optional embodiments, the top to bottom interior height of case 1200 is greater at opening 1214 than at the other end of the case to cause clasp 1212 to bend and reduce the size of opening 1214, thus securely grasping the bridge of the eyeglasses.

Figure 16:
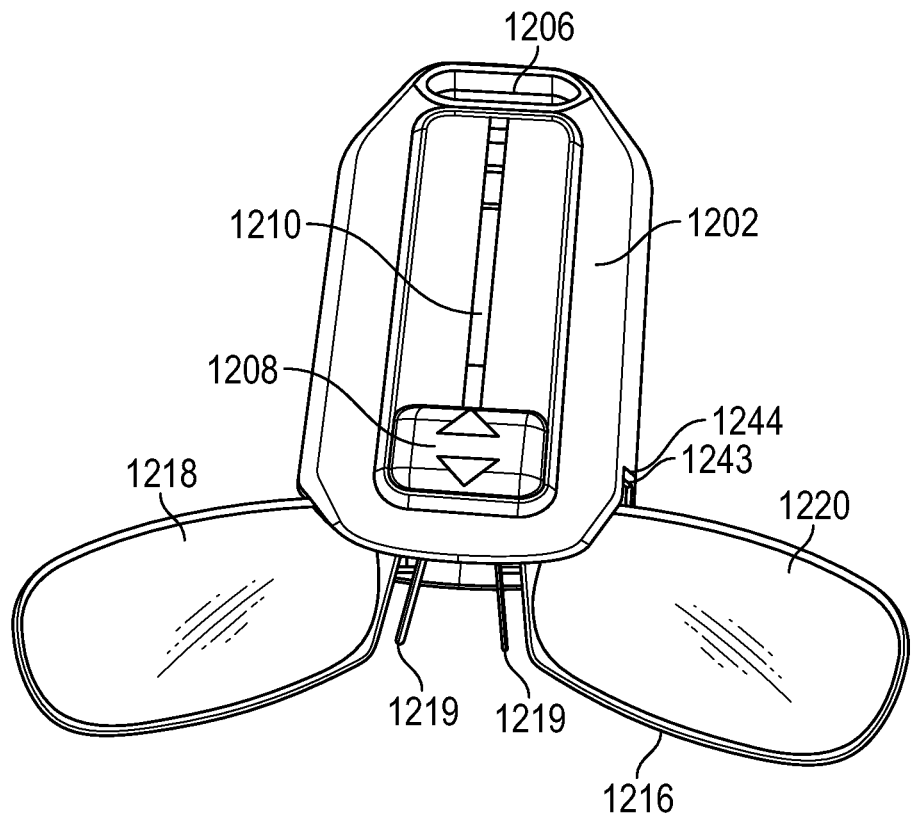
FIG. 16 is a perspective view of the eyeglasses case of FIG. 12 during insertion of eyeglasses.
Figure 17:
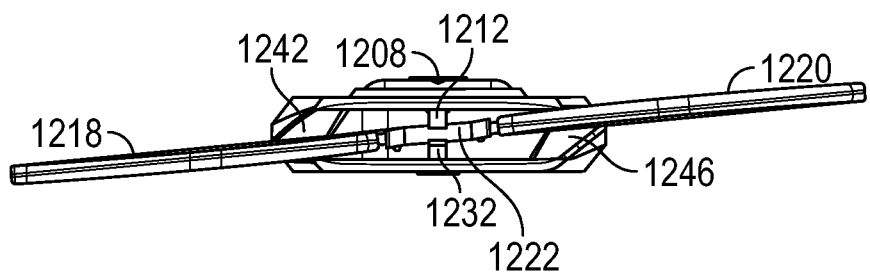
FIG. 17 is an end view of the eyeglasses case of FIG. 12 during insertion of eyeglasses.
Figure 18:
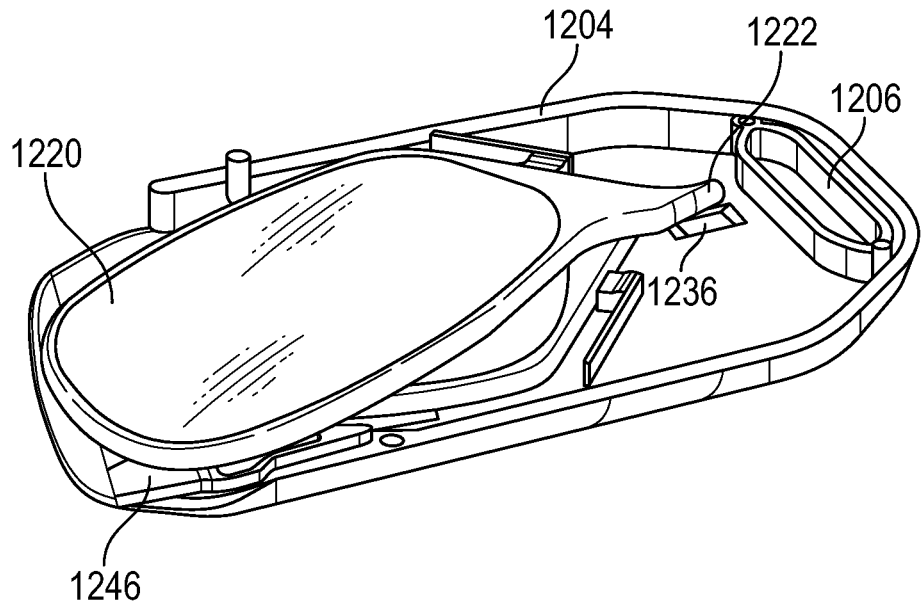
FIG. 18 is a perspective view of a bottom half of the eyeglasses case of FIG. 12 storing a pair of eyeglasses.
Figure 19:
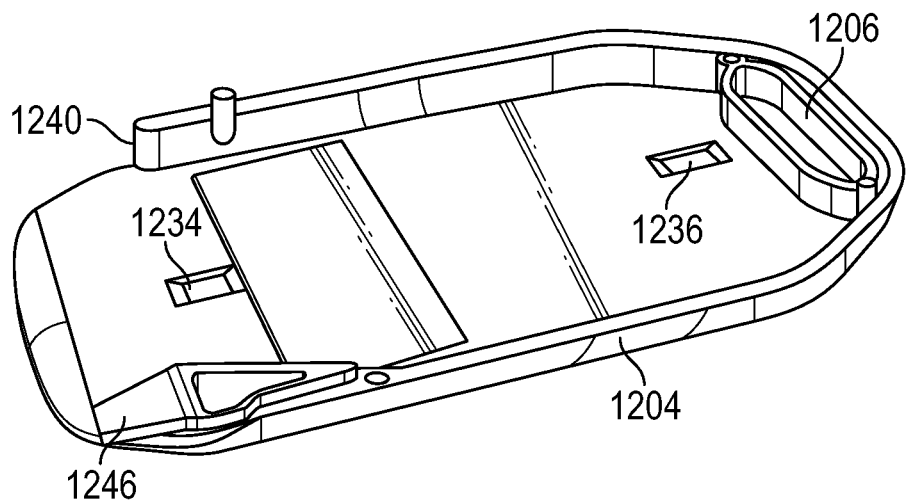
FIG. 19 is a perspective view of the bottom half of the eyeglasses case of FIG. 12 without eyeglasses.

The eyewear system of this invention is designed to fold the eyeglasses as the eyeglasses are inserted into the case. FIGS. 16 and 17 show eyeglasses 1216 at opening 1214 of case 1200 just prior to insertion. In these figures, actuator 1208 is in its forward-most position. During insertion, the top portion of eyeglasses 1216 engages a folding guide 1241 formed in part by a bearing surface 1240 on one side of opening 1214 and a corresponding folding guide 1243 formed in part by bearing surface 1244 on the other side of opening 1214. Guide 1241 also includes a tapered surface 1242 which is tapered down, and guide 1243 includes a tapered surface 1246 which is tapered up, so that their corresponding bearing surfaces are offset, thereby guiding lens 1218 down toward the bottom of the case and lens 1220 up towards the top of the case as the eyeglasses are inserted, as shown in FIG. 17. In the configuration shown in FIGS. 16 and 17, bendable bridge 1222 has moved up ramp 1232 and through opening 1230 to engage the engagement surface 1224 of clasp 1212. As actuator 1208 is moved back, surface 1238 of clasp 1212 (shown in FIG. 20) engages the bottom surface of case portion 1204, which causes clasp 1212 to bend around bridge 1222 and as it pulls eyeglasses 1216 into the case. Because the lenses 1218 and 1220 are offset, the lenses fold over each other within the case as the bridge is pulled back and as the top edge of the eyeglasses engage the bearing surfaces, resulting in the stored configuration shown in FIG. 18. The case contacts the eyeglasses only on the outside edge, and the lenses move around each other as they fold, thereby preventing scratching of the lenses. To retrieve the eyeglasses from the case, the actuator 1208 is slid forward in track 1210 to present the eyeglasses to a user in the configuration shown in FIG. 16.

FIGS. 21-24 illustrate yet another aspect of the invention. The eyeglasses 2100 have lenses 2101 and 2103 and a continuously variable width foldable bridge 2102. A flat superelastic (formed, e.g., from Nitinol wire, 0.4 mm thick, 0.8 mm wide) bridge wire 2104 is held at both ends by bridge holders 2106 and 2108, each having a cover 2107 and 2109, respectively. Inside each bridge holder, as shown in the view of the underside of cover 2107 in FIG. 21B, bridge wire 2104 is in tight sliding relationship with a friction element 2110, made from silicone or other suitable friction material and disposed in a cavity in the underside of cover 2107. A crimp or other stop 2112 at the ends of bridge wire 2104 slides within a slot 2120 and insures that the bridge wire does not come out of the bridge friction element 1210 and cover 2107. The user can push or pull the lenses with respect to each other to adjust the bridge width, and the friction in the bridge guides maintains the bridge width thereafter. The bridge guides are attached to the lenses via, e.g., pins 2122 that are heat staked through holes in the lenses. The lenses have suitable nose pads 2114 and 2116, such as those shown or such as the cantilevered nose pads described above. The user adjusts the nose bridge by pushing or pulling the lenses with respect to each other such that when they are worn on their face the top of the lenses are level as in FIG. 23 and the nose pads engage the top of the nose with appropriate force. The friction elements described above maintain this optimal bridge length between the lenses when the glasses are stored or retrieved for usage.

Figure 22:
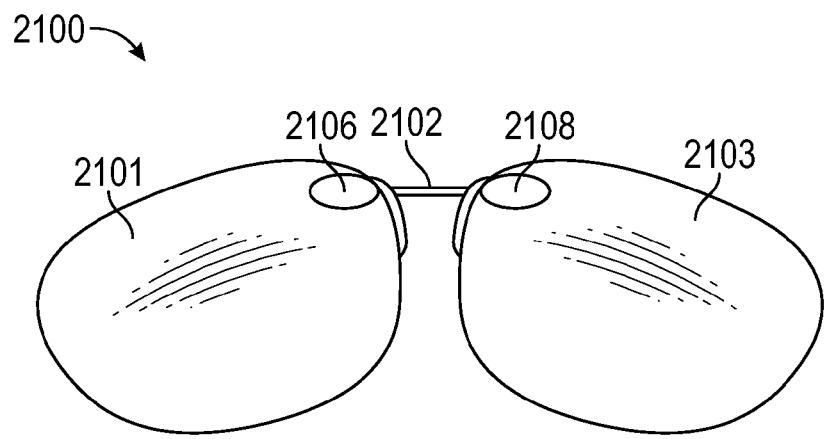
FIG. 22 is an elevational view of the eyeglasses of FIG. 21A in their at-rest configuration.
Figure 23:
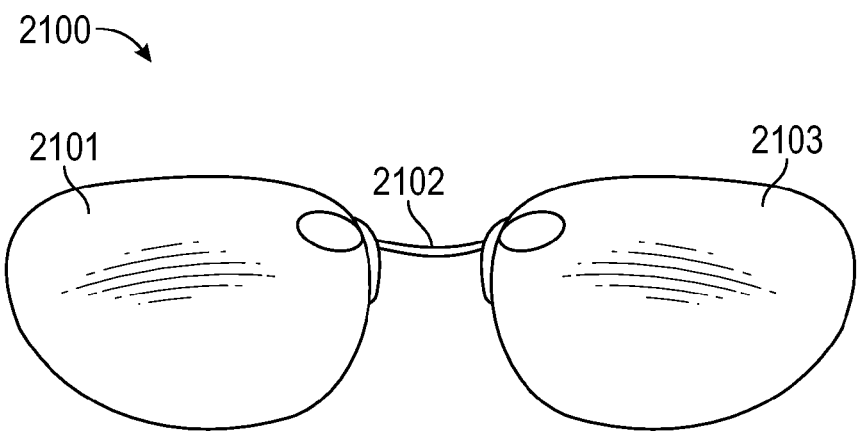
FIG. 23 is an elevational view of the eyeglasses of FIG. 21A in their as-worn configuration.
Figure 24:
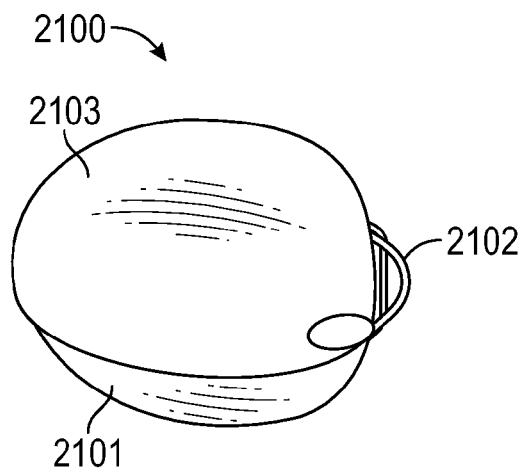
FIG. 24 is an elevational view of the eyeglasses of FIG. 21A in their stored configuration.

Eyeglasses 2100 may be used together with one of the eyeglasses cases described above. FIG. 22 shows eyeglasses 2100 in their at-rest position. FIG. 23 shows eyeglasses 2100 with bridge 2102 bent to its as-worn position. FIG. 24 shows eyeglasses 2100 in their folded and stored configuration in, e.g., a folding case such as the ones described above.

What is claimed is:
1. An eyewear system comprising eyeglasses and a case, the eyeglasses comprising a first lens, a second lens, and a bendable bridge disposed between the first lens and second lens, the bendable bridge comprising a spring providing a spring force when the bridge is bent from a rest position,
the eyeglasses being adapted to move from a wearable configuration in which the first and second lens do not overlap to a stored configuration in which the first and second lenses at least partially overlap, the bendable bridge being bent from its rest position in the stored configuration,
the case comprising an opening through which the eyeglasses pass during insertion and a clasp with an engagement surface sized and shaped to engage the bendable bridge of the eyeglasses and an actuator adapted to move the clasp from a first position near the opening in the case to a second position within the case away from the opening, movement of the clasp from the first position to the second position while the clasp is engaged with the bendable bridge of the eyeglasses being operative to move the eyeglasses into the case in the stored configuration.

2. The eyewear system of claim 1 wherein the actuator comprises a button on an outside surface of the case and movable within a slot within the case.

3. The eyewear system of claim 1 further comprising a first stop element positioned to hold the clasp in the first position and a second stop element positioned to hold the clasp in the second position.

4. The eyewear system of claim 1 wherein the clasp further comprises a retention portion shaped to retain the bendable bridge of the eyeglasses within the case.

5. The eyewear system of claim 4 wherein the clasp further comprises an opening and a bendable portion adapted to bend the retention portion from a first position in which the opening permits insertion of the bendable bridge and a second position in which the retention portion retains the bendable bridge.

6. The eyewear system of claim 5 wherein the retention portion moves from its first position to its second position as the clasp moves from its first position to its second position.

7. The eyewear system of claim 1 wherein the case further comprises guides sized and configured with respect to the eyeglasses to engage and fold the eyeglasses against spring force of the bridge to the stored configuration during insertion of the eyeglasses through the opening and into the case.

8. The eyewear system of claim 7 wherein the guides are offset from each other.

9. The eyewear system of claim 7 wherein the guides are adapted to move the first lens toward a bottom portion of the case and the second lens toward a top portion of the case.

10. A method of storing eyeglasses in a case, the eyeglasses comprising a first lens, a second lens, and a bendable bridge disposed between the first lens and second lens, the bendable bridge comprising a spring providing a spring force when the bridge is bent from a rest position, the method comprising:
engaging the bendable bridge with a movable clasp in the case;
moving the clasp to move the eyeglasses through an opening into the case; and
bending the bendable bridge against its spring force to fold the eyeglasses into a stored configuration within the case.

11. The method of claim 10 further comprising moving the clasp away from the opening after engaging the bendable bridge.

12. The method of claim 10 wherein the step of moving the clasp comprises sliding an actuator.

13. The method of claim 10 further comprising engaging the clasp with a stop element to hold it in position.

14. The method of claim 10 further wherein the step of engaging the bendable bridge with a movable clasp comprises inserting the bendable bridge through an opening in the movable clasp, the method further comprising closing the clasp opening to retain the bendable bridge in the clasp.

15. The method of claim 10 further comprising moving the first lens toward a top portion of the case and moving the bottom lens toward a bottom portion of the case during the moving and bending steps.

* * * * *